United States Patent
Wada et al.

(10) Patent No.: US 6,762,528 B2
(45) Date of Patent: Jul. 13, 2004

(54) ROTARY ELECTRIC MACHINE AND MANUFACTURING METHOD THEREOF

(75) Inventors: Hitoshi Wada, Fuwa-gun (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/307,305

(22) Filed: Dec. 2, 2002

(65) Prior Publication Data

US 2003/0102761 A1 Jun. 5, 2003

(30) Foreign Application Priority Data

Dec. 3, 2001 (JP) ........................................ 2001-368683

(51) Int. Cl.[7] .............................. H02K 3/12; H02K 3/04
(52) U.S. Cl. .......................... 310/201; 310/89; 310/180; 310/184
(58) Field of Search ................................. 310/179, 180, 310/184, 195, 198, 201, 208, 89

(56) References Cited

U.S. PATENT DOCUMENTS

| | | | | |
|---|---|---|---|---|
| 6,049,154 A | * | 4/2000 | Asao et al. | 310/201 |
| 6,222,295 B1 | * | 4/2001 | Umeda et al. | 310/179 |
| 6,252,326 B1 | * | 6/2001 | Umeda et al. | 310/179 |
| 6,388,358 B1 | * | 5/2002 | Umeda et al. | 310/201 |
| 6,441,527 B1 | * | 8/2002 | Taji et al. | 310/201 |

FOREIGN PATENT DOCUMENTS

| | | |
|---|---|---|
| JP | A 9-19108 | 1/1997 |
| JP | A 2001-37132 | 2/2001 |
| WO | WO 98/54823 | 12/1998 |

\* cited by examiner

*Primary Examiner*—Burton Mullins
(74) *Attorney, Agent, or Firm*—Oliff & Berridge, PLC (57) ABSTRACT

A vehicular alternator includes a stator, a rotor, and a housing. The stator has a stator core with a plurality of slots, and a stator coil passing through the slots. The stator coil is constructed of a plurality of electric conductors. Each electric conductor has insert portions located in the slot and a connecting portion connecting the insert portions axially outside of the stator core. The connecting portion has a first curve portion and a second curve portion. The first curve portion is located adjacent to an outer diameter of the stator core and the second curve portion is located adjacent to an inner diameter of the stator core. The first curve portion has curvature larger than that of the second curve portion.

23 Claims, 8 Drawing Sheets

OUTSIDE COIL    INSIDE COIL

FIG. 11
RELATED ART

OUTSIDE COIL    INSIDE COIL

ROTARY ELECTRIC MACHINE AND MANUFACTURING METHOD THEREOF

CROSS REFERENCE TO RELATED APPLICATION

This application is based on and incorporates herein by reference Japanese Patent Application No. 2001-368683 filed on Dec. 3, 2001.

FIELD OF THE INVENTION

The present invention relates to a rotary electric machine and its manufacturing method.

BACKGROUND OF THE INVENTION

In an alternator disclosed in WO98/54823, a stator has a stator coil that is constructed of a plurality of U-shaped conductor segments. The segments are inserted into slots of a stator core from an axial end of the stator core and the ends of the segments are connected on the opposite axial end of the stator core. With this stator, a compact, efficient, and low cost alternator is provided.

Further, in an alternator disclosed in JP-A-2000-37132, an insulation gap between legs of U-shaped conductor segment in a turn portion is larger than that of the insert portions of the U-shaped segment, which is located in the slot, in order to improve insulation in the turn portion.

Figure 10:
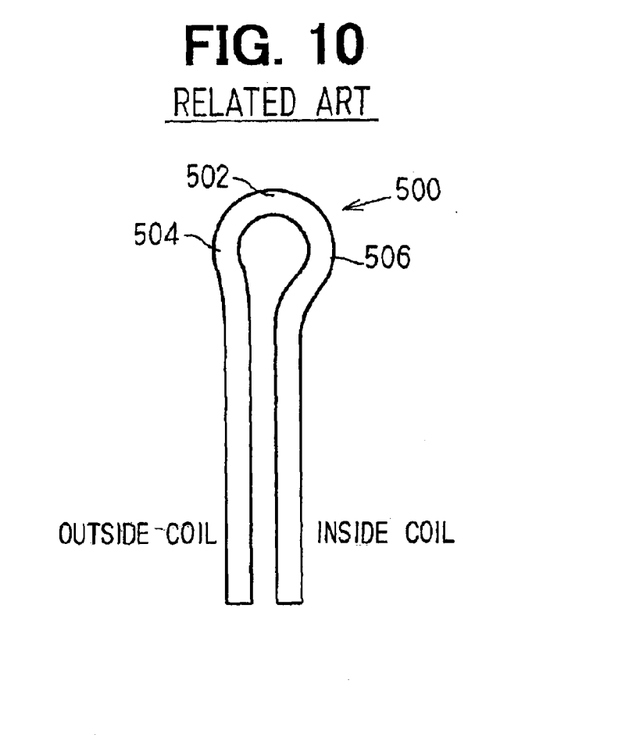
FIG. 10 is a schematic view of a conductor segment of a related art.

As the U-shaped segment of the stator coil, a segment 500 having its original shape shown in FIG. 10 is used. A turn portion 502 has a small curve portion 504, which is arranged adjacent to an outer diameter of the stator core in the slot, and a large curve portion 506, which is arranged adjacent to an inner diameter of the stator core in the slot. When the segments 500 are installed in the slots, the inside diameter of the coil end is smaller than the outside diameter of a rotor, thereby improving insulation in the turn portion.

In this stator, however, unevenness of the inner periphery of the coil end increases. Also, the coil end is placed close to a cooling air generating member. As a result, air pressure fluctuations increase due to gaps between the magnetic poles of the rotor and noise of a fan increases. In addition, since the inside diameter of the coil end is smaller than the outside diameter of the rotor, the flexibility of the manufacturing process planning is limited. As a result, it is difficult to reduce manufacturing costs.

Figure 11:
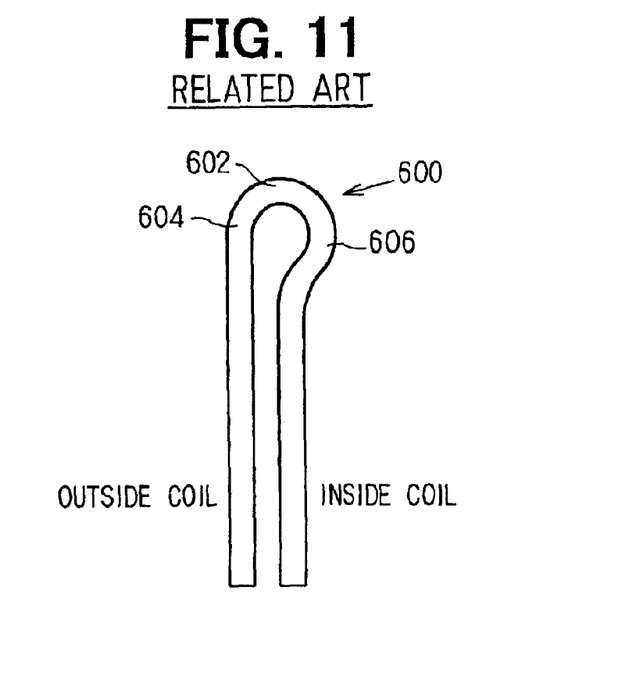
FIG. 11 is a schematic view of a conductor segment of a related art.

Furthermore, since the coil end is close to the magnetic poles of the rotor, the magnetic field generated in the poles is likely to affect the stator coil, resulting in degradation of the performance. The above problems may occur even in the cases using segments 600 shown in FIG. 11. The segment 600 is curved in a turn portion 602 such that a curve portion 606 that is arranged adjacent to the inner diameter of the stator core is curved and a portion 604 that is arranged adjacent to the outer diameter of the stator core is substantially flat.

Figure 9:
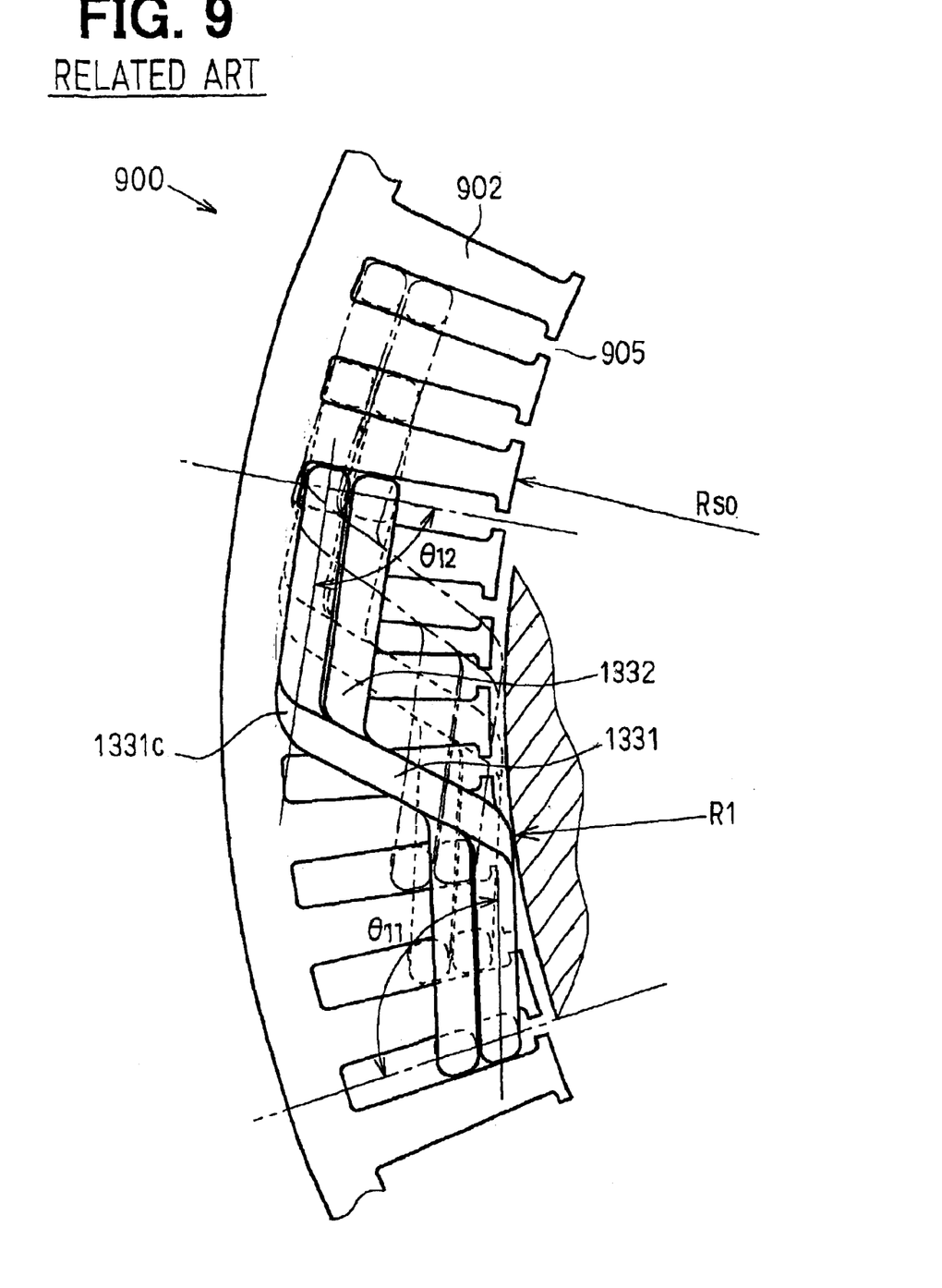
FIG. 9 is a partial end view of a stator core illustrating how conductor segments are installed in the slot, according to a vehicular alternator of a related art.

FIG. 9 shows a part of a stator 900 in which large segments 1331 and small segments 1332 are inserted in slots 905 of a stator core 902. An angle θ11 formed between the longitudinal centerline of the slot 905 coincident with a radius of the stator core 902 and the centerline of the large segment 1331 is approximately 110°. An angle θ12 formed between the longitudinal centerline of the slot 905 coincident with a radius of the stator core 902 and the centerline of the large segment 1331 is approximately 90°.

The angle θ11 is larger than the angle θ12. In other words, the turn portion 1331c is more curved on the inside of the stator core than the outside of the stator core. As a result, the smallest inside diameter R1 of the coil end is smaller than the inside diameter Rso of the stator core 902.

In a stator disclosed in JP-A-9-19108, multi-phase coil windings are inserted in a stator core and only the coil windings in one of the phases are curved toward an outer periphery of the stator core in a turn portion. Since only the coil windings in one of the phases are curved, the lengths of the coil windings and those of the coil windings in other phases are different. In other words, the resistances of the coil windings are different. As a result, the power generation performance decreases.

SUMMARY OF THE INVENTION

The present invention therefore has an objective to provide a rotary electric machine that is advanced in size, power output, and cost, while power generation performance, low fan noise, and ease of production are maintained.

The present invention has another objective to provide a manufacturing method for manufacturing the rotary electric machine.

A rotary electric machine of the present invention includes a rotor, a stator located radially outside the rotor, and a housing enclosing the rotor and the stator. The stator includes a stator core with a plurality of slots in its inner periphery, and a stator coil passing through the slots. The stator coil has insert portions located in the slots and connecting portions connecting the insert portions axially outside of the stator core. Each of the connecting portions has a first curve portion and a second curve portion. The first curve portion is located adjacent to an outer diameter of the stator core and the second curve portion is located adjacent to an inside diameter of the stator core. The first curve portion has curvature larger than that of the second curve portion.

With this configuration, evenness of an inner periphery of a coil end formed by the connecting portions is improved. Also, spaces between the coil end and a cooling air generating member, such as a fan, can be increased. Therefore, noise caused by the cooling air generating member is reduced. Further, since the first and second curve portions are formed on all connecting portions, resistances of conductors forming the stator coil are substantially equal. Therefore, the power generation performance can be maintained.

The stator coil is constructed of U-shaped wires. The U-shaped wire is manufactured by cutting a longitudinal wire into a predetermined length, bending the wire into a substantially U-shape, and forming a first curve portion in a curved portion of the U-shape. The first curve portion is formed on a side which is arranged adjacent to the outer diameter of the stator core. Then, the U-shape wire is twisted in a predetermined shape prior to an installation in the slot.

Since the first curve portion is formed prior to the twist and installation in the slot, the manufacturing process of the rotary electric machine is simplified. Further, manufacturing costs of the same can be reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1:
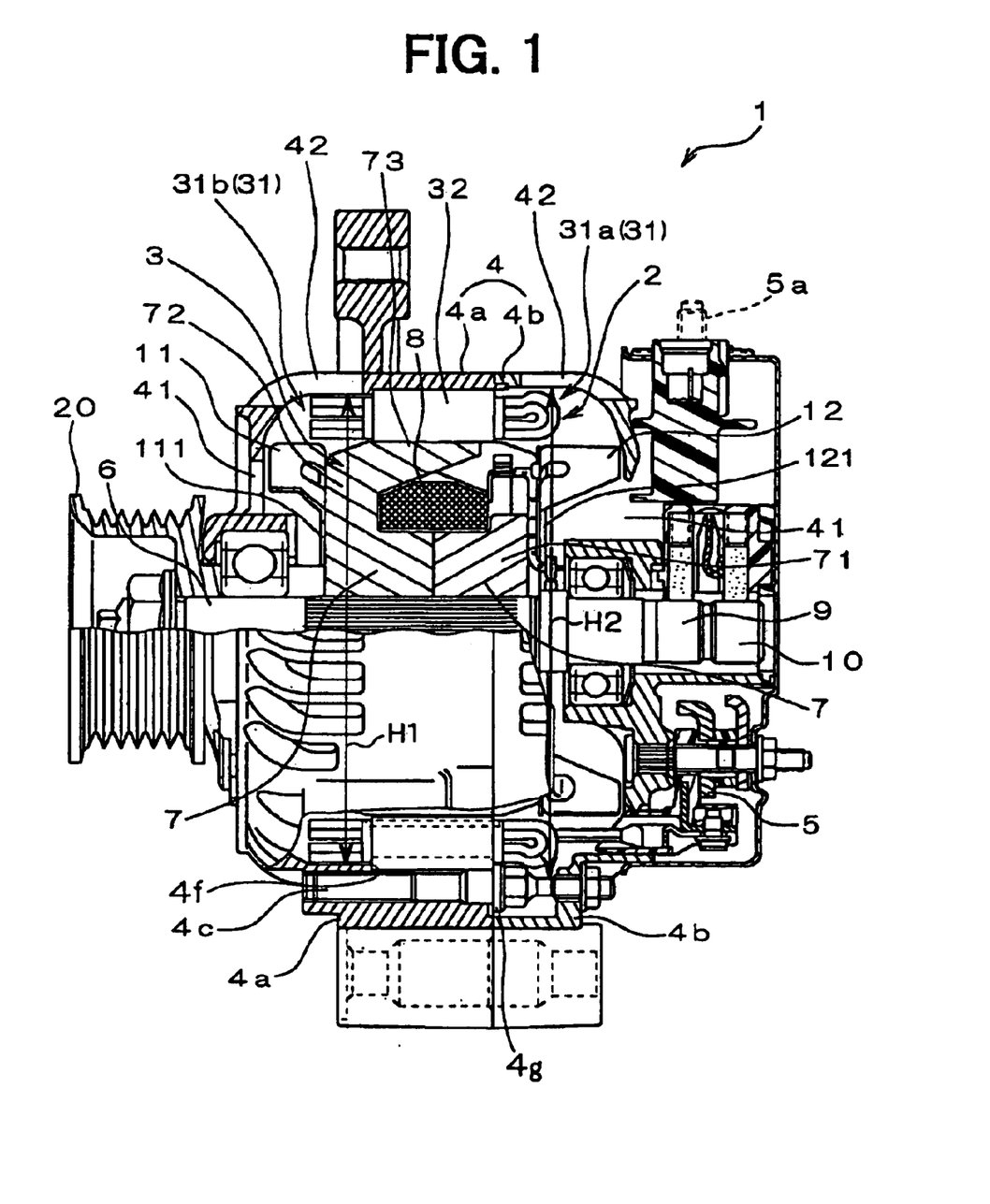
FIG. 1 is a schematic view of a vehicular alternator, partially includes cross-section, according to the embodiment of the present invention.

A vehicular alternator 1 shown in FIG. 1 is a three-phase generator and driven by an engine (not shown). The left side and the right side of the alternator 1 in FIG. 1 are referred to as a front end a rear end, respectively. The alternator 1 includes a stator 2, a rotor 3, a housing 4, and a rectifier 5. The rotor 3 rotates with a shaft 6, and functions as a field magnet. The rotor 3 includes a Lundell-type pole core 7, a field coil 8, slip rings 9, 10, a mixed flow fan 11, and a centrifugal fan 12. The shaft 6 is connected to a pulley 20, and rotated by the engine (not shown).

The Lundell-type pole core 7 is constructed of a pair of pole cores. Each pole core includes a boss portion 71 fixed around the shaft 6 and a disc portion 72, which extends from the axial end of the boss portion 71 in the radial direction. Also, the pole core 7 includes sixteen claw poles 73. The field coil 8 is wound around the boss portions 71.

The mixed flow fan 11 includes a base plate 111, inclined blades that are arranged at acute angles to the base plate 111 and right-angled blades that are arranged at right angles to the base plate 111. The base plate 111 is fixed to a front end surface of the pole core 7 by welding or other method, so that the mixed flow fan 11 rotates with the rotor 3. The centrifugal fan 12 includes a base plate 121, and blades that are arranged at right angles to the base plate 121. The base plate 121 is fixed to the rear end surface of the pole core 7 by welding or other method, so that the centrifugal fan 12 rotates with the rotor 3.

The stator 2 functions as an armature. The stator 2 is located to surround the outer periphery of the rotor 3. The stator 2 includes a stator core 32 and a multi-phase stator coil 31. The stator coil 31 is constructed of a plurality of electric conductors. The electric conductors are arranged in slots 35 formed in the inner periphery of the stator core 32. The stator coil 31 protrudes from the rear and front ends of the stator core 32 in the axial direction and forms a first coil end 31a and a second coil end 31b.

The housing 4 is constructed of a front housing 4a and a rear housing 4b. The housing 4 has air inlet holes 41 on its front and rear end surfaces. The housing 4 also has air outlet holes 42 in the portions opposed to the first coil end 31a and the second coil end 31b. The front housing 4a has a step 4f on its inner periphery.

The front housing 4a and the rear housing 4b are fastened with a stud bolt (fixing member) 4c such that the stator 2 and rotor 3 are held by the front and rear housings 4a and 4b. Specifically, the axial front end of the stator core 32 is in press-contact with the step 4f by being pressed with a flange 4f of the stud bolt 4c in the axial direction, so that the stator core 32 is sandwiched between the step 4f and the flange 4g.

The rectifier 5 is fixed to the end of the rear housing 4b and opposed to the first coil end 31a. The rectifier 5 rectifies an AC voltage outputted from the stator 2 to a DC voltage.

When rotating power is transferred from the engine to the pulley 20 via a belt and the like, the rotor 3 rotates in the predetermined direction. Under this condition, claw poles 73 of the pole core 7 are energized with application of an exiting voltage to the field coil 8. As a result, a three-phase voltage is generated at the stator coil 31, and a DC current appears at an output terminal 5a of the rectifier 5.

Next, the stator 2 is described in detail.

Figure 2:
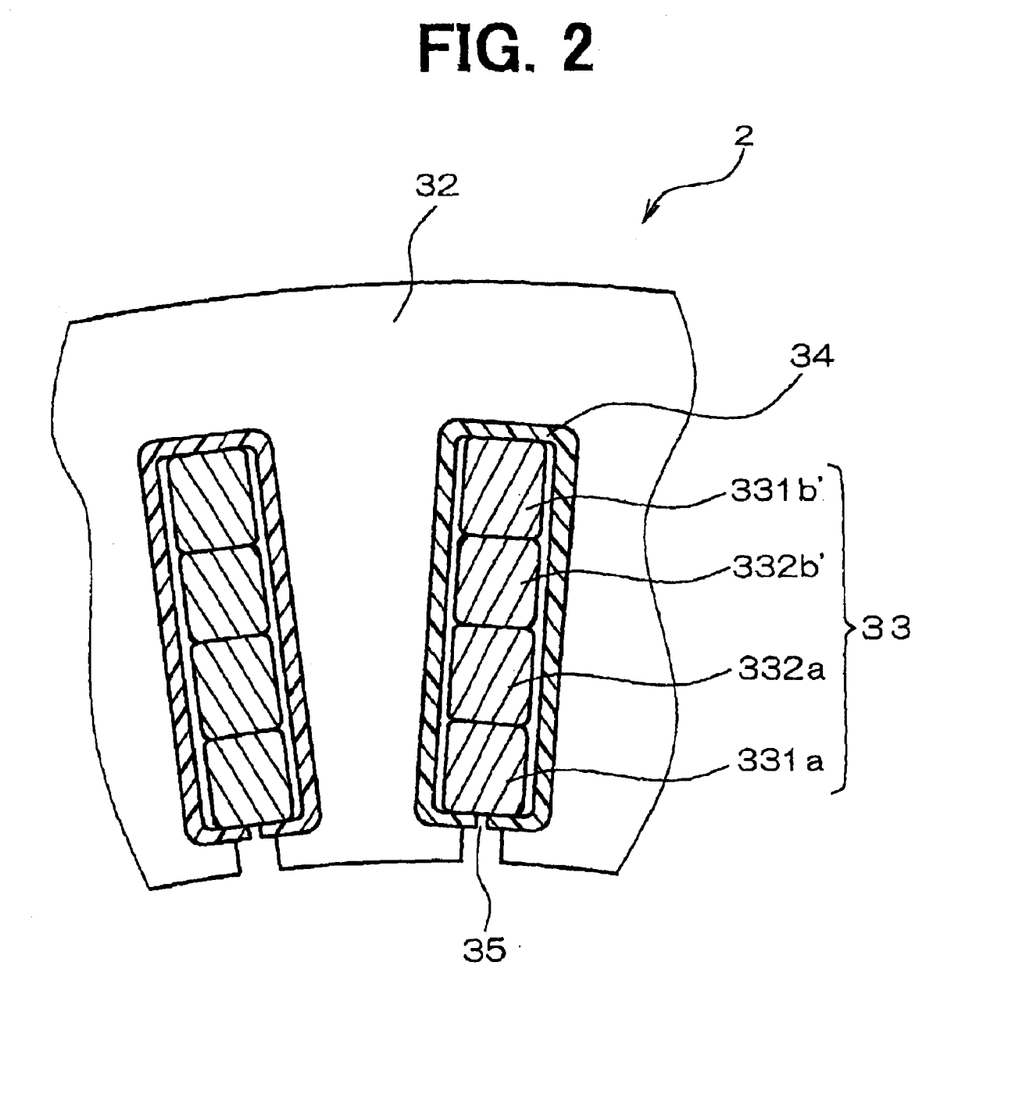
FIG. 2 is a cross-sectional view of a part of a stator according to the embodiment of the present invention.

As shown in FIG. 2, the stator core 32 has evenly spaced slots 35 opening radially inward of the stator core 32. The electric conductors of the stator coil 31 are arranged in the slots 35 through insulators 34. The insulators 34 provide electric insulation between the stator core 32 and the stator coil 31. The number of slots 35 is determined based on the number of poles of the rotor 3 and the number of the phases of the stator coil 31. In this embodiment, seventy-two slots are formed, for example.

Figure 3:
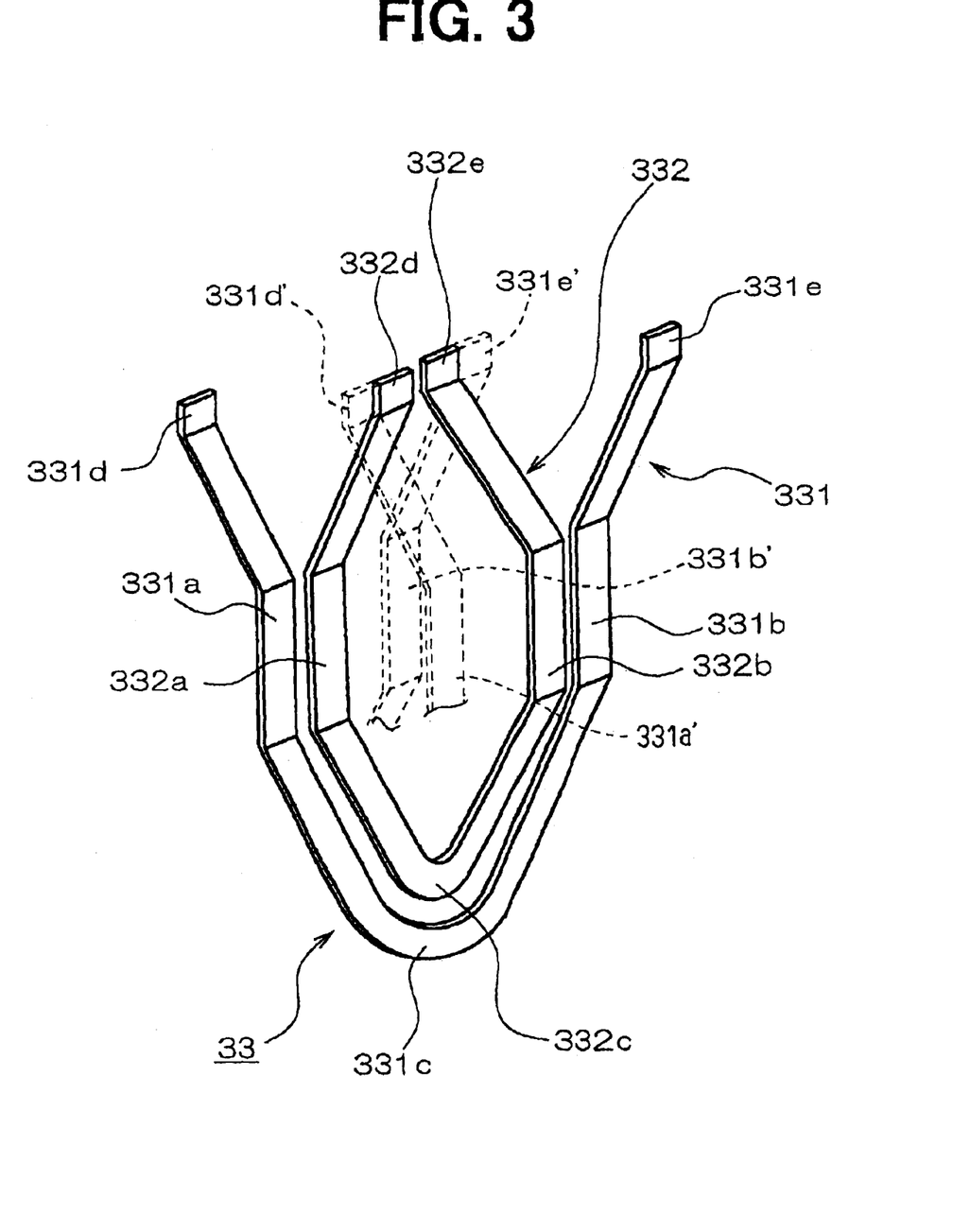
FIG. 3 is a perspective view of conductor segments illustrating shapes installed in a stator core according to the embodiment of the present invention.

FIG. 3 shows shapes of the electric conductor installed in the slots 35 of the stator core 32. The electric conductors 331, 332 are provided by shaping or twisting substantially U-shaped wires into predetermined shapes. Each conductor has substantially rectangular cross-section in even thickness. The conductors 331, 332 are arranged in a predetermined pattern to construct the stator coil 31.

In each slot 35, even-numbered electric conductors (e.g. four conductors in this embodiment) are installed to pass in the axial direction of the stator core 32. As shown in FIG. 2, straight portions (insert portions) 331a, 332a, 332b, 331b of the conductors 331, 332 are arranged in line, forming the inner layer (first layer), the inner middle layer (second layer), the outer middle layer (third layer), and the outer layer (fourth layer) in the radially outward direction of the stator core 32.

The first coil end 31a is constructed of connecting portions (turn portions) 331c, 332c of the conductors 331, 332 axially outside the stator core 32. The second coil end 31b is constructed by connecting ends 331d, 331e, 332d, 332e of conductors 331, 332 axially outside the stator core 32.

One conductor of one layer in a slot 35 pairs up with one conductor of another layer in a slot 35 that is in one pole pitch next to the slot 35 to maintain spaces between the conductors and to arrange the conductors orderly.

For example, the insert portion 331a of the first layer pairs up with the insert portion 331b of the fourth layer in the slot 35 that is one pole pitch next to that the insert portion 331a passes. The insert portion 332a of the second layer pairs up with the insert portion 332b of the third layer in the slot 35 that is one pole pitch next to that the insert portion 332a passes.

The insert portions 331a, 332a are connected to the insert portions 331b, 332b through the connecting portions 331c, 332c, respectively, at the axially outside the axial rear end of the stator core 32. At the axial end of the stator core 32, the turn portion 331c located outside the turn portion 332c. The connecting portions 331c form outer layer coil ends and the turn portions 332c form middle layer coil ends. The outer layer coil ends and middle layer coil ends form the first coil end 31a.

The insert portion 332a of the second layer also pairs up with the insert portion 331a' of the first layer in the slot 35 that is one pole pitch next to that the insert portion 332a passes. The insert portion 331b' of the fourth layer pairs up with the insert portion 332b of the third layer in the slot 35 that is one pole pitch next to that the insert portion 331b' passes. The end 332d of the insert portion 332a is connected to the end 331d' of the insert portion 331a' at the axially outside the axial front end of the stator core 32. The end 331e' of the insert portion 331b' is connected to the end 332e of the insert portion 332b at the axially outside the axial front end of the stator core 32.

The connecting portion of the ends 331d' and 332d and the connecting portion of the ends 332e and 331e' are arranged in the radial direction of the stator core 32, so that adjacent layer coil ends are formed. In this way, the connecting portions of the conductor ends are arranged without overlapping at the axially outside the axial front end of the stator core 32, so that the second coil end 31b is formed.

Here, the conductor 331 including the insert portions 331a, 331b, connecting portion 331c and ends 331d, 331e is referred to as a large segment. The conductor 332 including the insert portions 332a, 332b, connecting portion 332c and ends 332d, 332e is referred to as a small segment.

The large segments 331 and the small segments 332 are included in base segments 33. The base segments 33 are arranged in the slots 35 in specific patterns so that the stator coil 31 turning twice around the stator core 32 is formed. However, the segments forming lead-out wires of the stator coil 31 and turn portions connecting the first and second laps of the stator coil 31 are included in special shape segments. The stator coil 31 includes nine special shape segments. The special shaped coil end is formed by connecting the first lap and the second lap, that is, by connecting the inner layer coil end and the outer layer coil end.

Next, the manufacturing process of the stator coil 31 is described.

First, the base segments 33 are arranged such that the turn portions 331c of the large segments 331 pass outside the turn portions 332c of the small segments 332. Before installation in the slots 35, the segments 33 are twisted so that the insert portion 331a and the insert portion 332a respectively correspond to be in the first layer and second layer in the slot (first slot) 35, and the conductor 332b and the conductor 331b respectively correspond to be in the third layer and the fourth layer in another slot (second slot) 35 that is one pole pitch from the first slot in the clockwise direction of the stator core 32. Then, the twisted segments 33 are inserted into the slots 35 from the axial rear end of the stator core 32. Thus, the insert portions 331a, 331b, 332a, and 332b are arranged in the slots 35 in the manner described above.

After the insertion of the segments 33, the ends of the segments 33, which protrude from the axial front end of the stator core 32, are bent. Specifically, the ends 331d and 331e of the large segments 331 are bent as the ends 331d move from the ends 331e in the circumferential direction of the stator core 32. Each of the ends 331d, 331e of the large segments 331 reaches the point roughly one and a half slots away from the slot 35 that the segment 331 passes. The ends 332d and 332e of the small segments 332 are bent as the ends 332d become close to the end 332e. Each of the ends 332d, 332e reaches the point roughly one and a half slots away.

Figure 4:
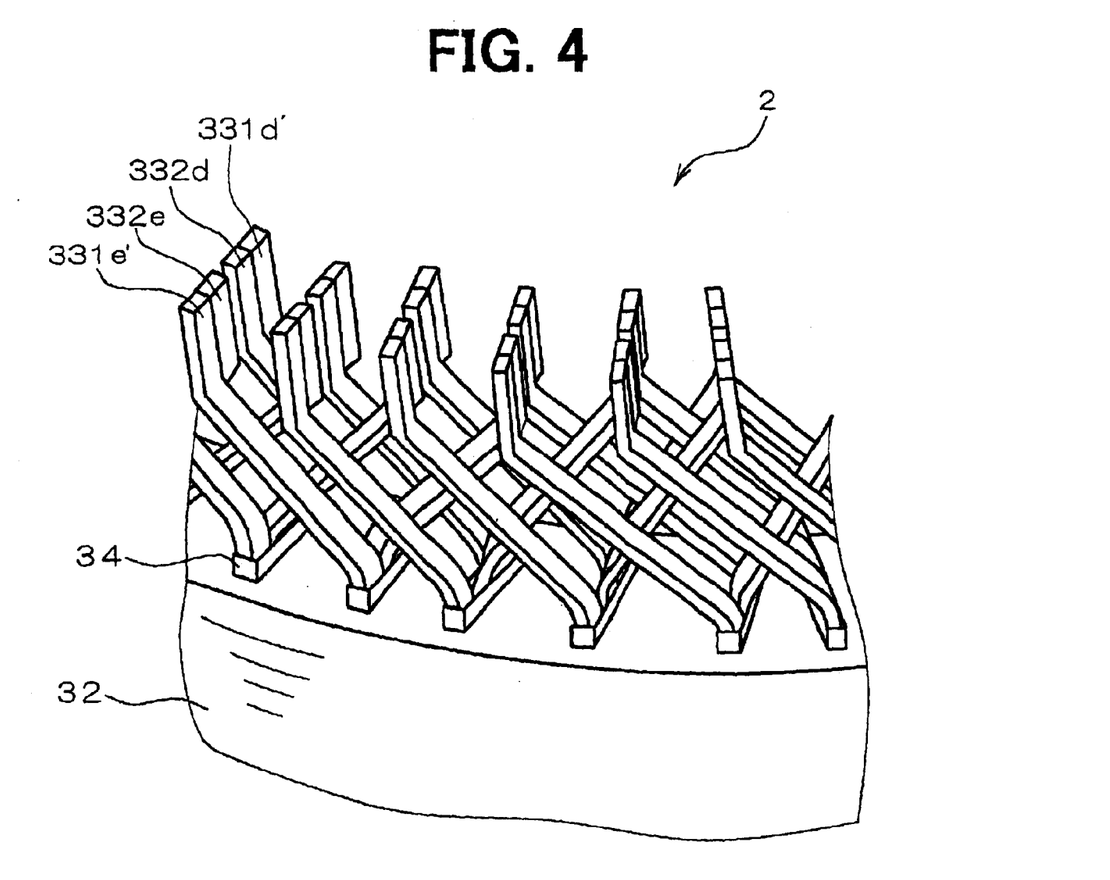
FIG. 4 is a perspective view of end portions of the conductor segments according to the embodiment of the present invention.

After the above steps are performed all segments 33 in the slots 35, the end 331e' of the fourth layer and the end 332e of the third layer are electrically connected by welding such as ultrasonic welding, arc welding, and brazing. Likewise, the end 332d of the second layer and the end 331d' of the first layer are electrically connected. When the above steps are completed for all ends as shown in FIG. 4, the second coil end 31b of the stator 2 is constructed.

Figure 5:
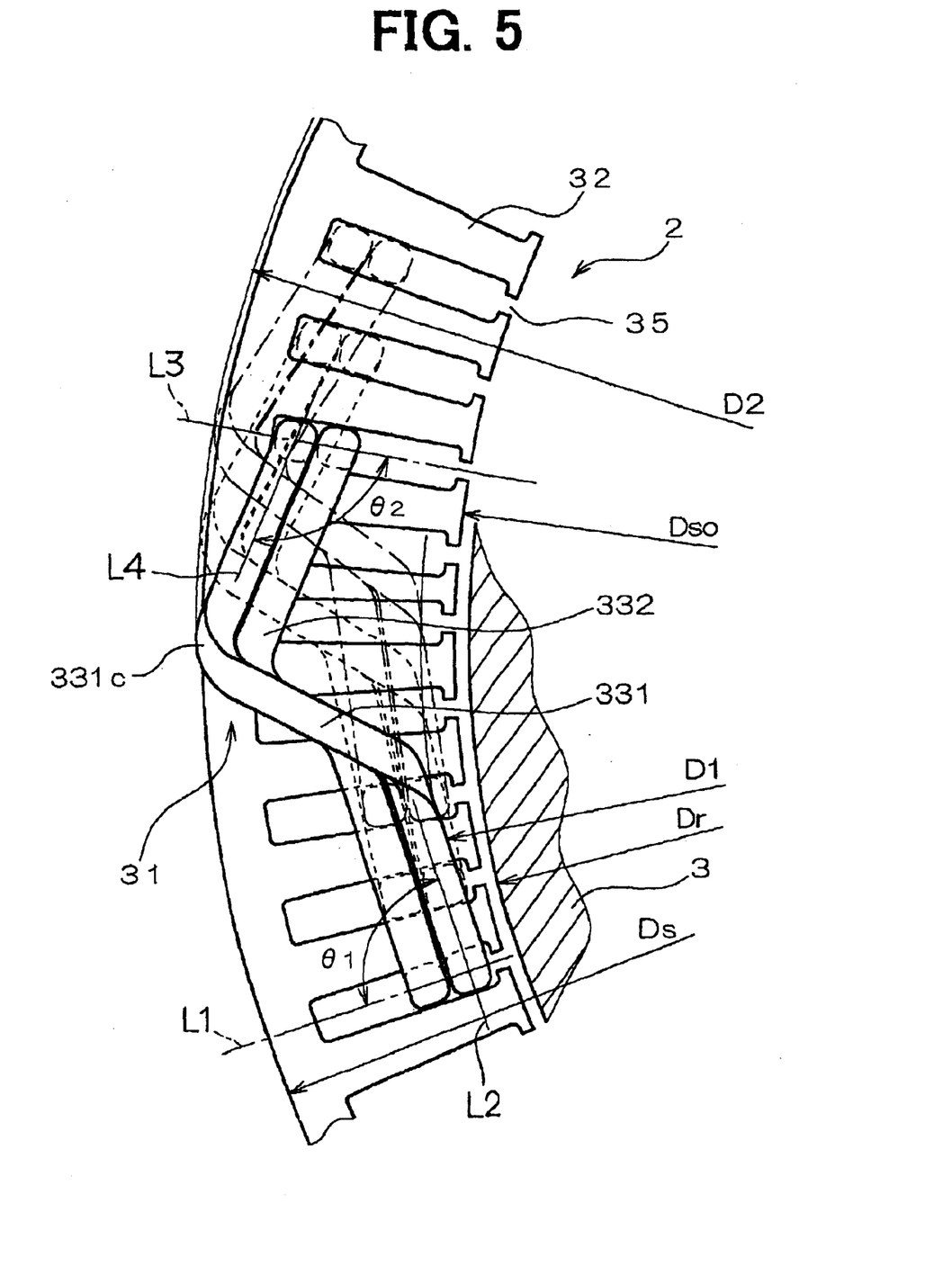
FIG. 5 is a partial end view of the stator core illustrating how the conductor segments are installed in slots according to the embodiment of the present invention.

When the stator core 2 is viewed from the axial rear end of the stator core 32, the large and small segments 331 and 332 are arranged as show in FIG. 5. An angle $\theta1$ formed between the longitudinal centerline L1 of the slot 35 coincident with a radius of the stator core 32 and the centerline L2 of the segment 331 extending from the first layer is approximately 90°. An angle $\theta2$ formed between the longitudinal centerline L3 of the slot 35 coincident with a radius of the stator core 32 and the centerline L4 of the segment 331 extending from the fourth layer is approximately 100°. That is, the angle $\theta2$ is larger than the angle $\theta1$.

Therefore, in the turn portion 331c, a curve adjacent to the inner diameter of the stator core 32 is smaller than a curve adjacent to the outer diameter of the stator core 32. The smallest inside diameter D1 of the first coil end 31a is larger than the inside diameter Dso of the stator core 32. The turn portion 331c is folded, at a part adjacent to the inner diameter of the stator core 32, toward the outer diameter side of the stator core 32 with respect to an inside diameter contact line of the slot 35. The small segments 332 are arranged in the same manner.

In addition, the smallest inside diameter D1 is larger than the outside diameter Dr of the rotor 3. The largest outside diameter D2 of the base segment 33, that is, the outer diameter of the first coil end 31a is larger than the outside diameter Ds of the stator core 32. This reduces interference in the coil ends 31a with the other components. Thus, the height of the coil ends can be reduced. This also reduces the fan noise because a space between the fan and the coil ends 31a is increased.

Figure 6:
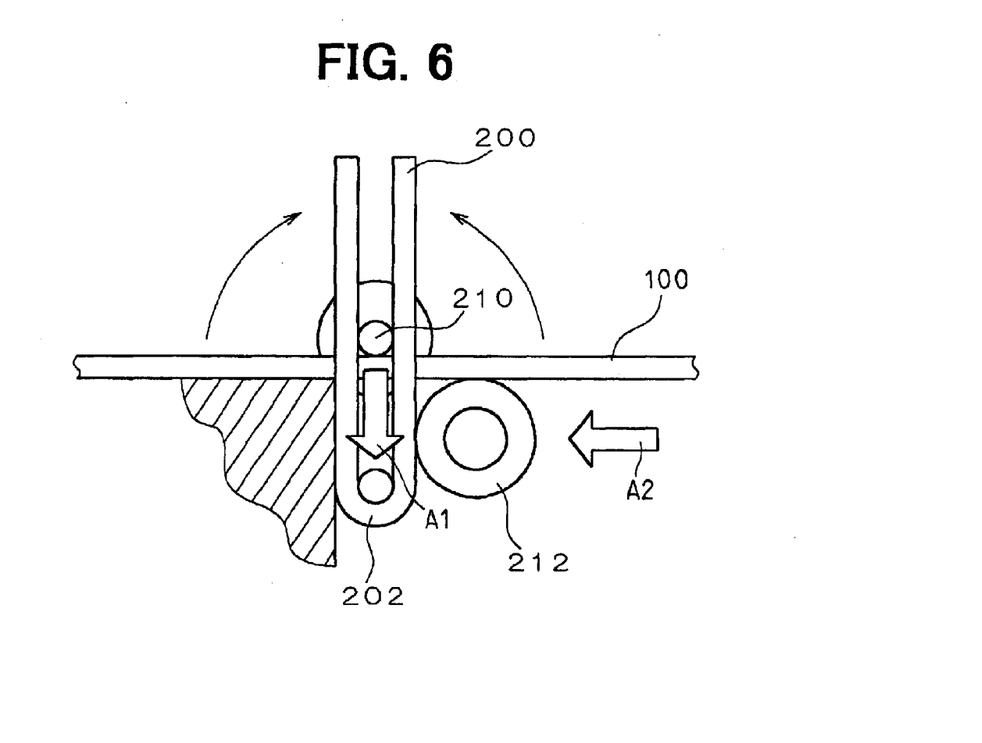
FIG. 6 is a schematic diagram showing how to produce the conductor segments according to the embodiment of the present invention.

The U-shaped wires for providing the segments 331, 332 are manufactured as shown in FIG. 6. First, a longitudinal wire is cut in a certain length to provide a straight wire 100 (step 1). Then, the straight wire 100 is placed in a specified position, and bent substantially into a U-shape by moving a movable pin 210 downward (shown by an arrow A1) (step 2). Thus, a U-shaped wire 200 having a turn portion 202, a first straight portion 205, and a second straight portion 207 is made.

Figure 7:
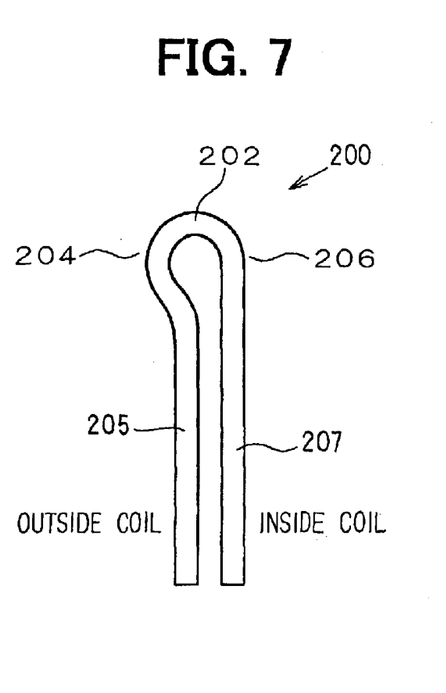
FIG. 7 is a schematic view of the conductor segment produced by the method shown in FIG. 6.

Next, a shaping roller 212 is moved in the horizontal direction (shown by an arrow A2), so that one side of the turn portion 202 is dented to form the curve portion (large curve portion) 204 (step 3), as shown in FIG. 7. The turn portion 202 has a flatter portion 206 on a side opposite to the large curve portion 204. Here, the large curve portion 204 is referred to as a first curve portion and the flatter portion 206 is referred to as a second curve portion. The turn portion 202 corresponds to the turn portion (connecting portion) 331c, 332c.

Before installation in the slots 35, the wires 200 are placed as the segments 33 such that the first curve portion 204 is to be adjacent to the outer diameter of the stator core 32 and the second curve portion 206 is to be adjacent to the inner diameter of the stator core 32 (adjacent to the rotor 3). Then, the wires 200 are twisted into the predetermined shape as described above and inserted in the slots 35, so the segments 33 are arranged as shown in FIG. 5.

A part of the first straight portion 205 corresponds to the insert portions 331b, 332b which are located in the slot 35 adjacent to the outer diameter of the stator core 32. A part of the second straight portion 207 corresponds to the insert portions 331a, 332a which are located in the slot 35 adjacent to the inner diameter of the stator core 32.

Since the turn portions 331c, 332c of the segments 331, 332 have the large curve portions 204 on the outer diameter side of the stator core 32 and the flat portions 206 on the inner diameter side, evenness of an inner periphery of the first coil ends 31a improves. With this, the spaces between the coil ends 31a, 31b and the cooling air generating means, such as the mixed flow fan 11 and the centrifugal fan 12 are widened. Therefore, the fan noise is reduced.

Furthermore, curves can be uniformly formed for all segments 33 other than the specific shaped segments. In other words, the segments 33 are produced in the same length (same resistance). As a result, power generation performance can be maintained.

In addition, since the first curve portions 204 are arranged adjacent to the outer diameter side of the stator core 32, the largest outside diameter D2 of the first coil end 31a is larger than the outside diameter Ds of the stator core 32. With this, the inner diameter H2 of the rear housing 4b, which faces the first coil end 31a is larger than the inner diameter H1 of the front housing 4a. Further, the rear housing 4b has the air holes 42 at a position facing the first coil end 31a. Therefore, the cooling performance is improved.

The segment 33 has substantially rectangular shaped cross-sections at least at insert portions, so that the area of the slot 35 occupied by the segments 33 increases. Therefore, high power output can be gained while the size is reduced. The cooling efficiency can be improved at the coil ends 31a because the air passages in the centrifugal direction increases, as compared with segments having circular-shaped cross-sections in the same cross-sectional areas.

The production of the stator 2 can be easier and reduced in cost by using the U-shaped wire 200 to form the stator coil 31. However, the present invention should not be limited to the embodiment previously discussed and shown in the figures, but may be implemented in various ways without departing from the spirit of the invention.

Figure 8:
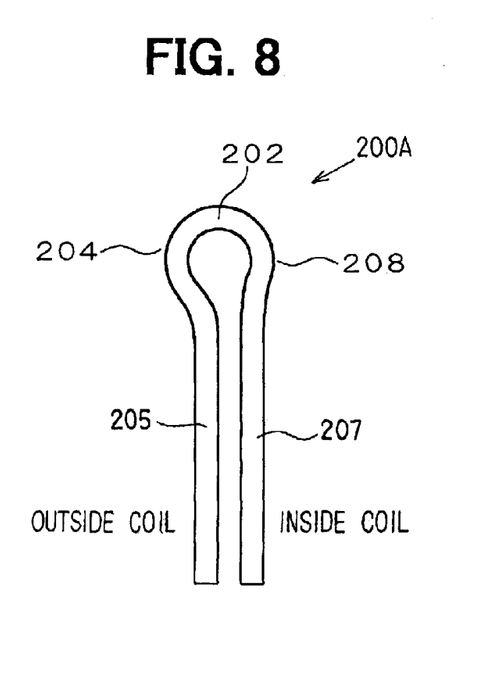
FIG. 8 is a schematic view of a modified conductor segment according to the embodiment of the present invention.

For instance, the second curve portion 206 may be slightly curved, as shown in FIG. 8. A U-shaped wire 200A has the small curve portion 208 on a side arranged to be adjacent to the inner diameter of the stator core 32, and the large curve portion 204 on a side arranged adjacent to the outer diameter side of the stator core 32. Curvature of the first curve portion 204 is larger than that of the second curve portion 208. To produce the U-shaped wire 200A, two shaping rollers 212 are used in the step 3. The first curve portion 204 and the second curve portion 208 are formed by applying forces with the two rollers 212 from both sides of the wire 200A.

The present invention can be applied to any kind of rotor electric devices other than the one for vehicular power generators.

What is claimed is:

1. A rotary electric machine comprising:
a rotor for generating magnetic fields;
a stator located radially outside the rotor; and
a housing enclosing the rotor and the stator,
wherein the stator includes a stator core with a plurality of slots in its inner periphery and a stator coil passing through the slots,
the stator coil has insert portions that are located in the slots and connecting portions that connect the insert portions axially outside of the stator core,
each of the connecting portions has a first curve portion and a second curve portion, the first curve portion is located adjacent to an outer diameter of the stator core, the second curve portion is located adjacent to an inner diameter of the stator core, and the first curve portion has curvature larger than that of the second curve portion, and
wherein the housing includes a first housing surrounding the periphery of the connecting portions and a second housing connected to the first housing, and an inside diameter of the first housing is larger than that of the second housing.

2. The rotary electric machine according to claim 1, further comprising:
a fixing member having a flange,
wherein the second housing has a step on its inner periphery and the stator core is held between the step and the flange.

3. A rotary electric machine comprising:
a rotor for generating magnetic fields;
a stator located radially outside the rotor, the stator including a stator core with a plurality of slots in its inner periphery and a stator coil passing through the slots; and
a housing enclosing the rotor and the stator, wherein
the stator coil has insert portions that are located in the slots and connecting portions that connect the insert portions axially outside of the stator core,
each of the connecting portions has a first curve portion and a second curve portion, the first curve portion is located adjacent to an outer diameter of the stator core, the second curve portion is located adjacent to an inner diameter of the stator core,
the first curve portion has curvature larger than that of the second curve portion,
a first angle $\theta 1$ is formed between a longitudinal centerline of the second curve portion and a longitudinal centerline of the slot in which the insert portion connecting the second curve portion is located and, a second angle $\theta 2$ is formed between a longitudinal centerline of the first curve portion and a longitudinal centerline of the slot in which the insert portion connecting the first curve portion is located, the longitudinal centerline of each slot being coincident with a radius of the stator core, and
the first angle $\theta 1$ is smaller than the second angle $\theta 2$.

4. The rotary electric machine according to claim 3, wherein
the connecting portions form a coil end, and a minimum inside diameter of the coil end is larger than an outside diameter of the rotor.

5. The rotary electric machine according to claim 3, wherein
the connecting portions form a coil end, and a maximum outside diameter of the coil end is larger than an outside diameter of the stator core.

6. A rotary electric machine comprising:

a rotor for generating magnetic fields;

a stator located radially outside the rotor, the stator including a stator core with a plurality of slots in its inner periphery, and a stator coil passing through the slots; and a housing enclosing the rotor and the stator, wherein the stator coil has first insert portions and second insert portions that are located in the slots and connecting portions each of which connects the first insert portion and the second insert portion axially outside of the stator core, the first insert portions are located closer to an outer diameter of the stator core in the slots than the second insert portions, each of the connecting portions includes a first side portion adjacent to the first insert portion and a second side portion adjacent to the second insert portion, the second side portion forms a first angle $\theta 1$ between a longitudinal centerline of the second side portion and a longitudinal centerline of the slot in which the second insert portion is located, and the first side portion forms a second angle $\theta 2$ between a longitudinal centerline of the first side portion and a longitudinal centerline of the slot in which the first insert portion is located, the longitudinal centerline of each slot being coincident with a radius of the stator core, and the first angle $\theta 1$ is smaller than the second angle $\theta 2$.

7. A rotary electric machine comprising:

a rotor for generating magnetic fields;

a stator located radially outside the rotor, and a housing enclosing the rotor and the stator, wherein the stator includes a stator core with a plurality of slots in its inner periphery and a stator coil passing through the slots, the stator coil has first insert portions and second insert portions that are located in the slots and connecting portions connecting the first insert portions and the second insert portions axially outside of the stator core, the first insert portions are located closer to an outer diameter of the stator core in the slots than the second insert portions, each of the connecting portions includes a first side portion adjacent to the first insert portion and a second side portion adjacent to the second insert portion, a distance of the first side portion is greater than that of the second side portion with respect to a longitudinal centerline equidistant between the first insert portion and the second insert portion; and wherein the housing includes a first housing surrounding the periphery of the connecting portions of the stator coil and a second housing connected to the first housing, and an inside diameter of the first housing is larger than that of the second housing.

8. The rotary electric machine according to claim 7, wherein the first side portion protrudes radially outward from a longitudinal centerline of the first insert portion and the second side portion protrudes radially inward from longitudinal centerline of the second insert portion, and a protruding volume of the first side portion is greater than that of the second side portion.

9. A rotary electric machine comprising:

a rotor for generating magnetic fields;

a stator located radially outside the rotor, the stator including a stator core with a plurality of slots in its inner periphery, and a stator coil passing through the slots; and a housing enclosing the rotor and the stator, wherein the stator coil has insert portions that are located in the slots, and connecting portions that connect the insert portions axially outside of the stator core, wherein each of the connecting portions has a first curve portion and a second curve portion, the first curve portion being located adjacent to an outer diameter of the stator core, the second curve portion being located adjacent to an inner diameter of the stator core, the first curve portion has curvature larger than that of the second curve portion;

wherein the stator coil is constructed of a plurality of substantially U-shaped electric conductors, each conductor having a first insert portion, a second insert portion, a turn portion, a first end portion, and a second end portion, wherein the first insert portion is located in a first slot adjacent to the outer diameter of the stator core and the second insert portion is located in a second slot adjacent to the inner diameter of the stator core, the second slot being one pole pitch from the first slot;

the turn portion connects the first insert portion and the second insert portion and forms the connecting portion; and the first and second end portions are provided at respective ends of the first and second insert portions, and each end portion is connected with an end of another conductor axially outside of the stator core on a side opposite to the connecting portions;

wherein a first angle $\theta 1$ is formed between a longitudinal centerline of the second slot coincident with a radius of the stator core and the centerline of the second curve portion of the connecting portion, and a second angle $\theta 2$ is formed between a longitudinal centerline of the first slot coincident with a radius of the stator core and the centerline of the first curve portion of the connecting portion, wherein each conductor is arranged so that a first angle $\theta 1$ is smaller than a second angle $\theta 2$.

10. The rotary electric machine according to claim 9, wherein the second curve portion is tangent to its connecting portion.

11. The rotary electric machine according to claim 1, wherein the connecting portions form a coil end, and a minimum inside diameter of the coil end is larger than an outside diameter of the rotor.

12. The rotary electric machine according to claim 1, wherein each of the insert portions has a substantially rectangular cross-section.

13. The rotary electric machine according to claim 1, wherein the housing defines air holes at portions opposing the first curve portions of the connecting portions of the stator coil.

14. The rotary electric machine according to claim 1, wherein each of the electric conductors is formed by twisting a substantially U-shaped wire before installation in the stator core.

15. The rotary electric machine according to claim 14, wherein the U-shaped wire has a first straight portion, a second straight portion and a curve portion connecting the first straight portion and the second straight portion, the curve portion including a first curve portion adjacent to the first straight portion and a second curve portion adjacent to the second straight portion, the first curve portion having curvature larger than that of the second curve portion, wherein the first straight portion forms the first insert portion and the second straight portion forms the second insert portion when the U-shaped wire is twisted and installed in the stator core.

16. The rotary electric machine according to claim 15, wherein the second curve portion is tangent to its curve portion.

17. A method for manufacturing the rotary electric machine according to claim 15, comprising the steps of:

cutting a longitudinal wire into a predetermined length;

bending the wire substantially into a U-shape to make the first straight portion, the second straight portion and the curve portion; and forming the first curve portion from the curve portion, thereby producing the U-shaped wire.

18. The method of manufacturing the rotary electric machine according to claim 17, further comprising the step of:

twisting the U-shaped wire prior to its installation in the stator core.

19. The method for manufacturing the rotary electric machine according to claim 17, further comprising the step of:

forming a curve on the second curve portion of the curve portion such that the second curve portion has curvature smaller than that of the first curve portion.

20. A rotary electric machine comprising:

a rotor for generating magnetic fields;

a stator located radially outside the rotor, the stator including a stator core with a plurality of slots in its inner periphery, and a stator coil passing through the slots; and a housing enclosing the rotor and the stator, wherein the stator coil has insert portions that are located in the slots, and connecting portions that connect the insert portions axially outside of the stator core, wherein each of the connecting portions has a first curve portion and a second curve portion, the first curve portion is located adjacent to an outer diameter of the stator core, the second curve portion being located adjacent to an inner diameter of the stator core, first curve portion has curvature larger than that of the second curve portion, wherein the stator coil is constructed of a plurality of substantially U-shaped electric conductors, each conductor having a first insert portion, a second portion, a turn portion, a first end portion, and a second end portion, wherein the first insert portion is located in a first slot adjacent to the outer diameter of the stator core and the second insert portion is located in a second slot adjacent to the inner diameter of the stator core, the second slot being one pole pitch from the first slot;

the turn portion connects the first insert portion and the second insert portion and forms the connecting portion; and the first and second end portions are provided at respective ends of the first and second insert portions, and each end portion is connected with an end of another conductor axially outside of the stator core on a side opposite to the connecting portions;

wherein the housing includes a first housing surrounding the end portions of the stator coil and a second housing surrounding the connecting portions of the stator coil, and an inside diameter of the second housing is larger than that of the first housing.

21. The rotary electric machine according to claim 20, further comprising:

a fixing member having a flange, wherein the first housing has a step on its inner periphery and the stator core is held between the step and the flange by being pushed axially with the fixing member.

22. The rotary electric machine according to claim 21, wherein the fixing member is a bolt for fastening the first housing and the second housing.

23. A rotary electric machine comprising:

a rotor for generating magnetic fields;

a stator located radially outside the rotor, the stator including a stator core with a plurality of slots in its inner periphery, and a stator coil passing through the slots; and a housing enclosing the rotor and the stator, wherein the stator coil has insert portions that are located in the slots, and connecting portions that connect the insert portions axially outside of the stator core, wherein each of the connecting portions has a first curve portion and a second curve portion, the first curve portion being located adjacent to an outer diameter of the stator core, the second curve portion being located adjacent to an inner diameter of the stator core, the first curve portion has curvature larger than that of the second curve portion, wherein the connecting portions form a coil end, and a maximum outside diameter of the coil end is larger than an outside diameter of the stator core.

* * * * *